(12) United States Patent
Chen et al.

(10) Patent No.: US 8,370,518 B2
(45) Date of Patent: Feb. 5, 2013

(54) METHOD AND APPARATUS FOR SELECTIVELY INSTALLING WEBPAGE PLUG-IN

(75) Inventors: Yang Chen, Guangdong (CN); Feng Lin, Guangdong (CN); Fan Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1251 days.

(21) Appl. No.: 11/615,466

(22) Filed: Dec. 22, 2006

(65) Prior Publication Data

US 2007/0174424 A1 Jul. 26, 2007

Related U.S. Application Data

(63) Continuation of application No. PCT/CN2005/000898, filed on Jun. 22, 2005.

(30) Foreign Application Priority Data

Jun. 22, 2004 (CN) .......................... 2004 1 0027798

(51) Int. Cl.
*G06F 15/16* (2006.01)
(52) U.S. Cl. ............ 709/232; 709/217; 726/22; 726/23; 726/24; 726/25
(58) Field of Classification Search .................. 709/232, 709/217; 726/22–25
See application file for complete search history.

(56) References Cited

U.S. PATENT DOCUMENTS

| 6,092,194 A * | 7/2000 | Touboul .......................... 726/24 |
| 2003/0023770 A1 | 1/2003 | Barmettler et al. |
| 2003/0093508 A1 | 5/2003 | Li et al. |
| 2003/0200300 A1 | 10/2003 | Melchione |
| 2004/0083474 A1 | 4/2004 | McKinlay et al. |

FOREIGN PATENT DOCUMENTS

| CN | 1128417 C | 11/2003 |
| JP | 2000-089875 A | 3/2000 |

OTHER PUBLICATIONS

Chinese Office Action for Chinese Patent Application No. 2004100277985, dated Jan. 12, 2007, and English translation thereof.

* cited by examiner

*Primary Examiner* — Andrew Georgandellis (57) ABSTRACT

Embodiments of the present invention disclose a method and an apparatus for selectively installing a webpage plug-in. The method includes: when there is a webpage plug-in in a webpage, determining whether the webpage plug-in has been shielded by a subscriber according to a list of shielded plug-ins that records information of webpage plug-ins shielded by the subscriber; terminating a procedure of selectively installing the webpage plug-in if the webpage plug-in has been shielded; downloading the webpage plug-in and installing the webpage plug-in if the webpage plug-in has not been shielded. The apparatus includes a browser control and an auxiliary tool of download and installation of a webpage plug-in and. According to the embodiments of the present invention, the speed of browsing a webpage is improved.

15 Claims, 5 Drawing Sheets

METHOD AND APPARATUS FOR SELECTIVELY INSTALLING WEBPAGE PLUG-IN

CROSS-REFERENCE TO RELATED APPLICATIONS

This application is a continuation of International Application No. PCT/CN2005/000898 filed Jun. 22, 2005. This application claims the benefit of Chinese Patent Application No. 200410027798.5 filed Jun. 22, 2004. The disclosures of the above applications are incorporated herein by reference.

FIELD

The present disclosure relates to the technique for downloading data in communication filed, and more particularly, to a method and an apparatus for selectively installing a webpage plug-in.

BACKGROUND

The statements in this section merely provide background information related to the present disclosure and may not constitute prior art.

In order to enrich the visual and audio enjoyment obtained from the Internet, at present, multiple webpage developers have employed such webpage plug-in using the networking multimedia object technique as the ActiveX plug-in and the like to make applications of Web more flexible and accesses to the Internet rapider and more convenient.

For the purpose of preventing insecurity factors from entering a local computer that a subscriber is using through the webpage plug-in, each webpage plug-in has a security certificate showing its own security. Taking the ActiveX plug-in as an example, the security certificate of ActiveX plug-in, issued after a special organization evaluates the security of ActiveX plug-in, is packed along with the ActiveX plug-in to be distributed. Only the ActiveX plug-in with a legal security certificate can be normally installed and run in the computer of a subscriber.

Figure 1:
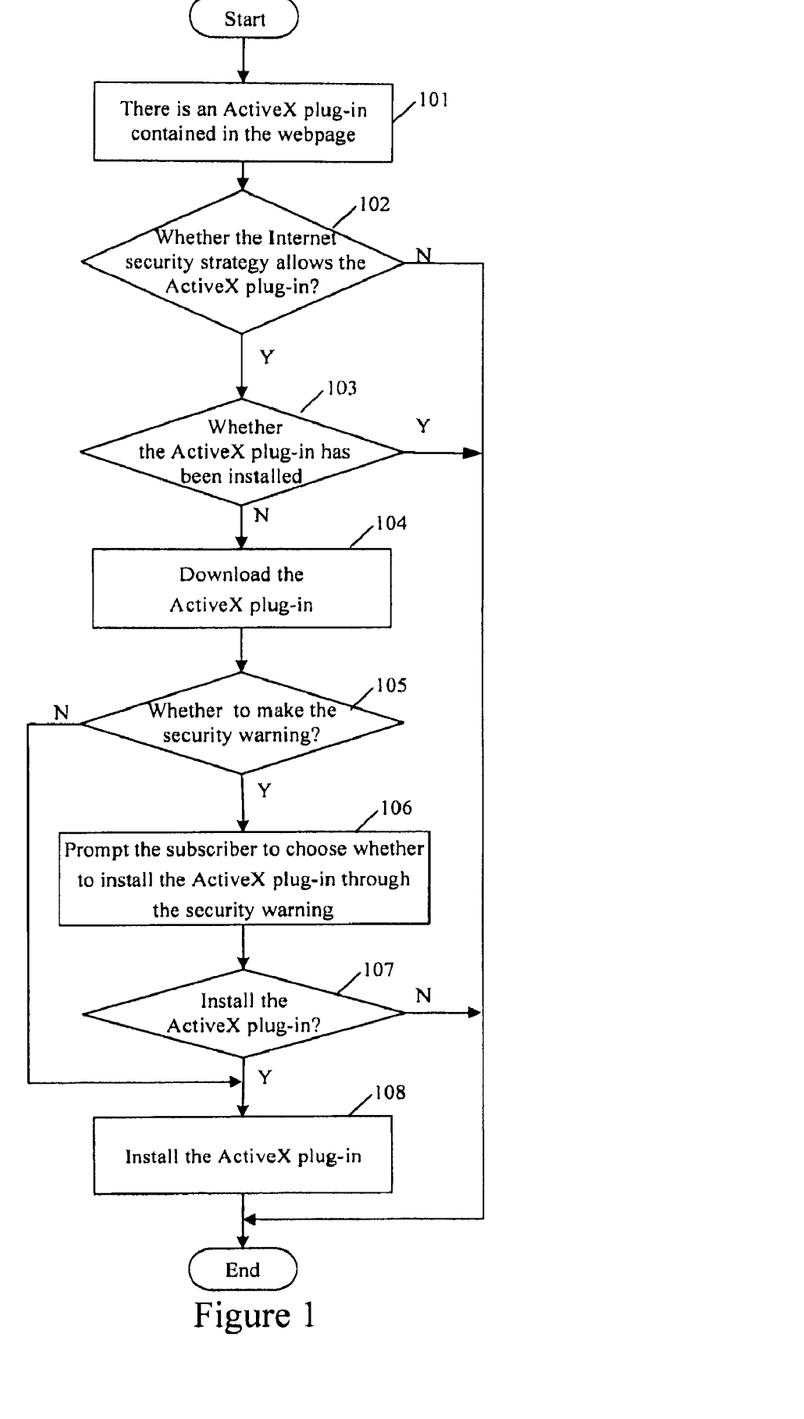

Referring to FIG. 1 and taking the ActiveX plug-in as an example, the existing method for selectively installing a webpage plug-in includes the following steps.

Steps 101~102: an Internet Explorer (IE) control detects that there is an ActiveX plug-in in the webpage and then determines whether the Internet security strategy of a browser allows the ActiveX plug-in to be used. If the ActiveX plug-in is allowed to be used, Step 103 would be performed. Otherwise, the procedure of selectively installing the ActiveX plug-in is terminated.

Such browsers as the IE and the like all include an IE control for detecting whether there is an ActiveX plug-in. Thus, when a subscriber opens a webpage containing an ActiveX plug-in, the browser, through its own IE control, obtains information of the ActiveX plug-in contained in the webpage such as Global Unique Identifiers (GUID), Uniform Resource Locator (URL) of installation packet, and the like.

In order to facilitate the subscriber in configuring operations of the browser on the webpage plug-in and the script, the operating system used by the subscriber classifies the Internet security strategies of the browser as high, middle, middle-low, and low levels. Except the high level, other security levels all allow using a secure ActiveX plug-in. The method for determining whether the ActiveX plug-in is allowed to be used includes determining that the ActiveX plug-in is allowed to be used if the Internet security strategy of the browser is at the middle, middle-low, or low level and the security certificate of the ActiveX plug-in is legal; otherwise, determining that the ActiveX plug-in is not allowed to be used.

Steps 103~104: determine whether the local computer has installed an identical ActiveX plug-in. If the local computer has installed an identical ActiveX plug-in, the procedure of selectively installing the plug-in is terminated. Otherwise, the ActiveX plug-in is downloaded to the local computer.

When there is the identical ActiveX plug-in installed in the local computer, it indicates that the local computer has finished installing and running the ActiveX plug-in and it is unnecessary to process the identical ActiveX plug-in again. When there is no identical ActiveX plug-in installed in the local computer, it indicates that the local computer has not installed and run the ActiveX plug-in and the ActiveX plug-in is downloaded for selectively installing the ActiveX plug-in in the follow-up process.

Steps 105~107: determine whether to make a security warning according to the Internet security strategy of the browser. If it is determined to make a security warning, the subscriber is prompted through the security warning to choose whether to install the ActiveX plug-in. Then determine whether to install the ActiveX plug-in according to a choice of the subscriber; if it is determined to install the ActiveX plug-in, Step 108 would be performed; otherwise, the procedure of selectively installing the plug-in is terminated. If it is determined not to make a security warning, Step 108 is performed directly.

The security warning means providing such information as name and source of the ActiveX plug-in, organization issuing the security certificate, and the like for the subscriber and prompting the subscriber to choose whether to install the ActiveX plug-in. The method for determining whether to make a security warning includes determining to make a security warning if the Internet security strategy of the browser is at the middle or middle-low level, otherwise, determining not to make a security warning if the Internet security strategy of the browser is at the low level.

After the security warning is made, the subscriber determines whether to install the ActiveX plug-in according to his/her own need. If the subscriber chooses to install the ActiveX plug-in, proceed to perform the follow-up process, otherwise, terminate the procedure of selectively installing the plug-in as it is unnecessary to carry out any processing of the ActiveX plug-in.

Step 108: install the ActiveX plug-in in the local computer.

If the Internet security strategy of the browser indicates that the ActiveX plug-in may be installed directly without making the security warning or the subscriber chooses to install the ActiveX plug-in in the local computer under the prompt of the security warning, the ActiveX plug-in downloaded in Step 104 is installed in the local computer in this process.

Thus, the existing procedure of selectively installing a webpage plug-in is completed.

Although the conventional method above ensures the security of using the ActiveX plug-in and allows the subscriber to choose whether to install the webpage plug-in in the webpage according to his/her need, in case that the network traffic is relatively high while the network speed is not so high, if the subscriber browses a webpage containing a webpage plug-in, the download of the plug-in will block the webpage and lower the speed of browsing the webpage. In addition, in order to determine whether the subscriber desires to install the webpage plug-in, a security warning window has to be popped up to inquire of the subscriber whether to install the plug-in, which disturbs the subscriber who does not need the plug-in and makes the procedure less convenient.

SUMMARY

Embodiments of the present invention provide a method for selectively installing a webpage plug-in and an apparatus for selectively installing a webpage plug-in to improve the speed of browsing a webpage.

One embodiment of the present invention provides a method for selectively installing the webpage plug-in.

The method for selectively installing the webpage plug-in includes:

when there is a webpage plug-in in a webpage, determining whether the webpage plug-in has been shielded by a subscriber according to a list of shielded plug-ins that records information of webpage plug-ins shielded by the subscriber;

terminating a procedure of selectively installing the webpage plug-in if the webpage plug-in has been shielded by the subscriber;

downloading the webpage plug-in and installing the webpage plug-in if the webpage plug-in has not been shielded by the subscriber.

The method further includes:

before downloading the webpage plug-in, determining whether an Internet security strategy of a browser allows the webpage plug-in to be used;

downloading the webpage plug-in if the Internet security strategy of the browser allows the webpage plug-in to be used;

terminating the procedure of selectively installing the webpage plug-in if the Internet security strategy of the browser does not allow the webpage plug-in to be used.

The method further includes:

before downloading the webpage plug-in, determining whether a local computer has installed an identical webpage plug-in;

terminating the procedure of selectively installing the webpage plug-in if the local computer has installed an identical webpage plug-in;

downloading the webpage plug-in if the local computer has not installed an identical webpage plug-in.

Said determining whether the webpage plug-in has been shielded by the subscriber includes:

determining that the webpage plug-in has been shielded by the subscriber if there is a record for the webpage plug-in in the list of shielded plug-ins;

determining that the webpage plug-in has not been shielded by the subscriber if there is no record for the webpage plug-in in the list of shielded plug-ins.

The method further includes:

before downloading the webpage plug-in, prompting the subscriber to choose whether to download the webpage plug-in;

downloading the webpage plug-in if the subscriber chooses to download the webpage plug-in;

updating the list of shielded plug-ins and terminating the procedure of selectively installing the webpage plug-in if the subscriber chooses not-to-download any more.

The method further includes:

upon prompting the subscriber to choose whether to download the webpage plug-in, terminating the procedure of selectively installing the webpage plug-in if the subscriber chooses not-to-download and prompt later.

The method further includes:

before installing the webpage plug-in, determining whether to make a security warning according to the Internet security strategy of the browser;

if determining to make the security warning, prompting the subscriber to choose whether to install the webpage plug-in through the security warning;

determining whether to install the webpage plug-in according to a choice of the subscriber;

installing the webpage plug-in in the local computer if the subscriber chooses to install the webpage plug-in;

terminating the procedure of selectively installing the webpage plug-in if the subscriber chooses not to install the webpage plug-in;

if determining not to make the security warning, performing said installing the webpage plug-in.

Said downloading and installing the webpage plug-in includes:

downloading the webpage plug-in in a local computer;

determining whether to make a security warning according an Internet security strategy of a browser;

if determining to make the security warning, prompting the subscriber to choose whether to install the webpage plug-in through the security warning;

determining whether to install the webpage plug-in according to a choice of the subscriber; installing the webpage plug-in in the local computer if the subscriber chooses to install the webpage plug-in; terminating the procedure of selectively installing the webpage plug-in if the subscriber chooses not to install the webpage plug-in;

if determining not to make the security warning, performing said installing the webpage plug-in.

The method further includes:

before terminating the procedure of selectively installing the webpage plug-in, prompting the subscriber to choose subsequent processing of the webpage plug-in;

terminating the procedure of selectively installing the webpage plug-in if the subscriber chooses not-to-download and prompt later;

updating the list of shielded plug-ins if the subscriber chooses not-to-download any more.

Said updating the list of shielded plug-ins includes adding information of the webpage plug-in to the list of shielded plug-ins.

Another embodiment of the present invention provides an apparatus for selectively installing a webpage plug-in.

The apparatus for selectively installing a webpage plug-in includes:

a browser control, configured to detect a webpage plug-in in a webpage, download and install the webpage plug-in in a local computer; and an auxiliary tool of download and installation of a webpage plug-in, configured to monitor the browser control, obtain information of the webpage plug-in from the browser control, store a list of shielded plug-ins recording information of webpage plug-ins shielded by a subscriber, determine whether the webpage plug-in has been shielded by the subscriber according to the list of shielded plug-ins; instruct the browser control to download and install the webpage plug-in if the webpage plug-in has not been shielded by the subscriber; terminate a procedure of selectively installing the webpage plug-in if the webpage plug-in has been shielded by the subscriber.

The auxiliary tool of download and installation of a webpage plug-in includes:

a webpage plug-in download and installation monitoring module, configured to monitor the browser control, obtain a process of downloading and installing the webpage plug-in and the information of the webpage plug-in;

a proxy module, configured to receive the process of downloading and installing the webpage plug-in and the information of the webpage plug-in from the webpage plug-in download and installation monitoring module, deputize the browser control, start up operations of the browser control on downloading and installing the webpage plug-in;

a shielded plug-in list module, configured to store the list of shielded plug-ins, obtain the information of webpage plug-ins shielded by the subscriber from the proxy module, determine whether the webpage plug-in has been shielded by the subscriber, update the list of shielded plug-ins and send a determining result to the proxy module if webpage plug-in has been shielded.

The apparatus further includes:

a procedure control module, configured between the proxy module and the shielded plug-in list module to receive the process of downloading and installing the webpage plug-in and the information of the webpage plug-in forwarded by the proxy module and the determining result sent by the shielded plug-in list module, manage the procedure of download and installation of the webpage plug-in, instruct the proxy module to deputize the browser control and start up the operations of the browser control on downloading and installing the webpage plug-in; and transfer the information of webpage plug-ins shielded by the subscriber to the shielded plug-in list module.

Preferably, the apparatus further includes a subscriber interaction module, configured to display a prompt related to downloading and installing the webpage plug-in, and return a choice of the subscriber to the procedure control module.

According to the embodiment of the present invention, a list of shielded plug-ins is preset for storing the information of webpage plug-ins which the subscriber would not download any more. When a webpage plug-in appears in a webpage, if the webpage plug-in has been shielded by the subscriber, terminate directly the procedure of selectively installing the webpage plug-in, which avoids both the appearances of various prompts and download of the webpage plug-in, and thus avoids the network congestion caused by the prompts and download of the webpage plug-in and improves the speed of browsing the webpage.

In the embodiment of the present invention, only when the subscriber chooses to-download will the webpage plug-in be downloaded to the local computer, which reduces the probability of downloading a webpage plug-in, saves network resources, and accelerating the network speed.

According to embodiments of the present invention, when the subscriber chooses not-to-download the webpage plug-in or not-to-install the webpage plug-in any more, the information of the webpage plug-in is added to the list of shielded plug-ins, and meanwhile the subscriber is informed that a webpage plug-in is shielded by means of, e.g., making an icon blinking, which increases the transparency of selectively installing the webpage plug-in and thus is benefit for the subscriber to resume download and installation of the shielded plug-in.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a flow chart illustrating an existing method for selectively installing a webpage plug-in.

DETAILED DESCRIPTION

The following description is merely exemplary in nature and is not intended to limit the present disclosure, application, or uses. It should be understood that throughout the drawings, corresponding reference numerals indicate like or corresponding parts and features.

Embodiments of the present invention are hereinafter described in detail with reference to accompanying drawings.

One embodiment of the present invention describes a method for selectively installing a webpage plug-in, in which a list of shielded plug-ins is preset for storing the information of webpage plug-ins shielded by the subscriber, and the method includes the following steps.

When a browser control detects that a webpage plug-in appears in a webpage, the auxiliary tool of download and installation of the webpage plug-in obtains information of the webpage plug-in, deputizes and monitors the browser control, and determines, according to the list of shielded plug-ins, whether the webpage plug-in has been shielded by the subscriber.

If the webpage plug-in has been shielded by the subscriber, terminate the procedure of selectively installing the webpage plug-in.

Otherwise, when the state of the webpage plug-in changes, prompt, according to a monitoring result from the auxiliary tool of download and installation of the webpage plug-in, the subscriber to choose processing of the webpage plug-in. According to a choice of the subscriber, install the webpage plug-in downloaded in the local computer or update the list of shielded plug-ins using the information of the webpage plug-in.

In order to manage the download and installation of the webpage plug-in, the auxiliary tool of download and installation of the webpage plug-in is adopted to modify the existing method provided by the browser control for selectively installing a webpage plug-in so as to implement embodiments of the present invention.

During implementing the method, the process of downloading the webpage plug-in to the local computer may be implemented before or after the subscriber chooses to install the webpage plug-in. The above two implementing manners will be described, respectively, supposing that the browser control is the IE control and the webpage plug-in is the ActiveX plug-in.

In a first embodiment, the webpage plug-in is downloaded after the subscriber chooses to install the webpage plug-in.

Figure 2:
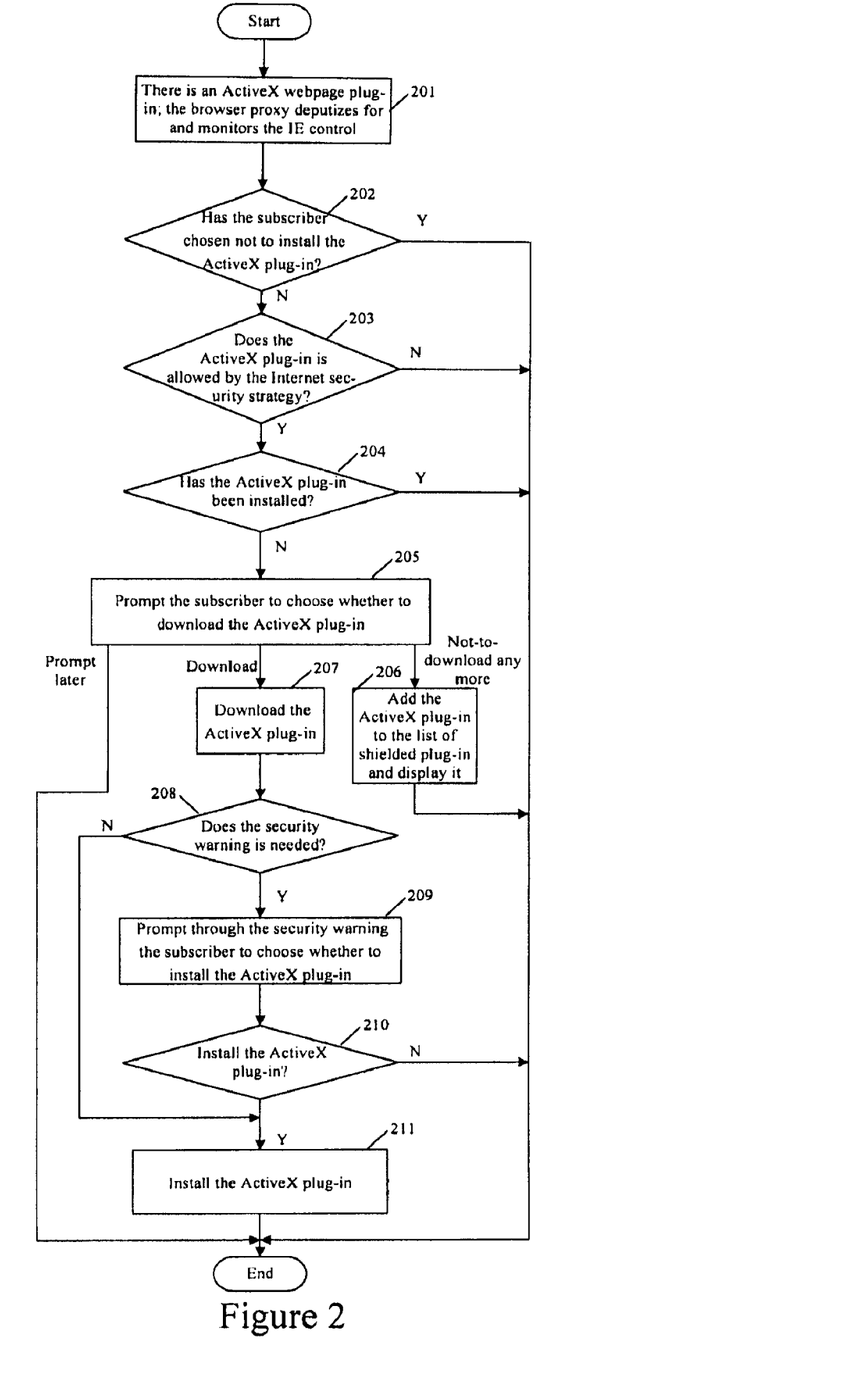
FIG. 2 is a flow chart illustrating a method for selectively installing a webpage plug-in in accordance with a first embodiment of the present invention.

As shown in FIG. 2, the method for selectively installing the webpage plug-in in accordance with the first embodiment includes the following steps.

Step 201: the IE control detects an ActiveX plug-in contained in the webpage that the subscriber is browsing. The auxiliary tool of download and installation of the webpage plug-in deputizes and monitors the IE control.

When detecting that there is an ActiveX plug-in contained in the webpage, the IE control obtains information of the ActiveX plug-in, for example, the GUID, the URL of installation package of the webpage plug-in, and so on. And then, the IE control notifies the auxiliary tool of the existence of the ActiveX plug-in. The auxiliary tool then deputizes and monitors the IE control to manage the download and installation of the ActiveX plug-in described in the subsequent process.

Figure 3:
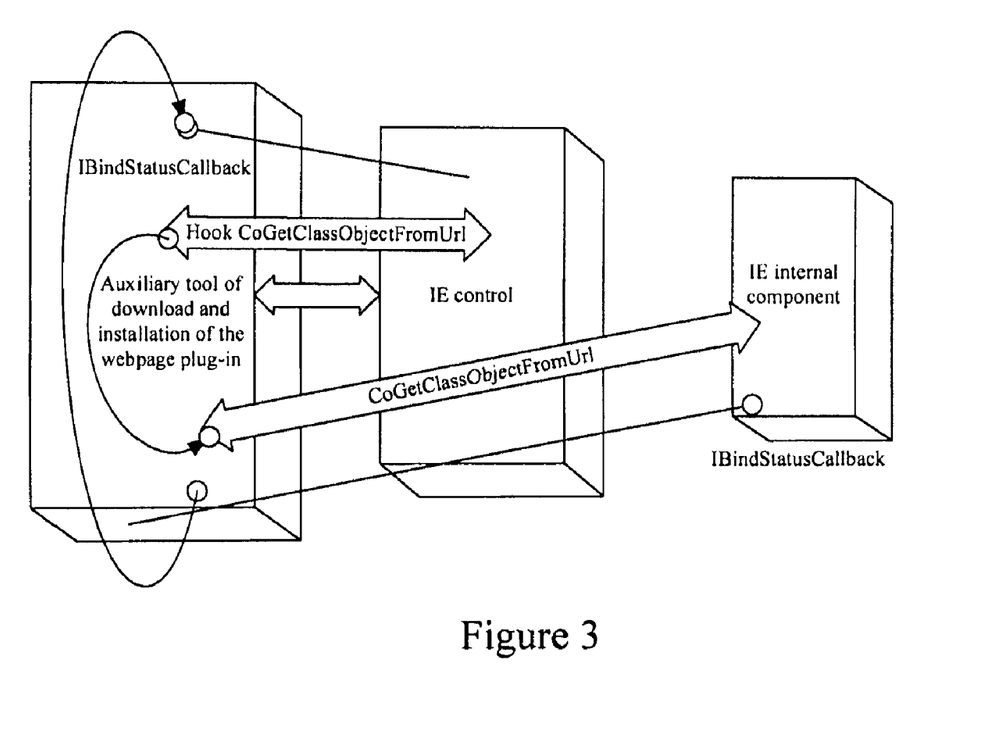
FIG. 3 is a schematic diagram illustrating a method for an auxiliary tool of download and installation of the webpage plug-in according to an embodiment of the present invention to deputize and monitor an IE control.

As shown in FIG. 3, the process of deputizing and monitoring the IE control includes:

the auxiliary tool intercepts the invoking of the CoGetClassObjectFromUrl API function by the IE control using the Application Program Interface Hook (API Hook) technique, deputizes the IBindStatusCallback interface of the IE control using its own IBindStatusCallback interface and returns control rights to the CoGetClassObjectFromUrl API function.

Generally, when detecting that there is an ActiveX plug-in contained in the webpage, the IE control invokes the CoGetClassObjectFromUrl API function provided by the operating system to create a local ActiveX plug-in according to the URL of the installation package of the ActiveX plug-in to facilitate the download and installation of the ActiveX plug-in. The interception of the invoking of the CoGetClassObjectFromUrl API function by the IE control aims at delaying the processing of the ActiveX plug-in by the IE control for a moment so as to perform the deputization of IBindStatusCallback interface.

In the operating system using the IE control, the function of IBindStatusCallback interface is to manage download and installation of the ActiveX plug-in. Moreover, if the operating system uses the IBindStatusCallback interface of the IE control, the control right of download and installation of the ActiveX plug-in is possessed by the IE browser privately and may only be implemented according to the conventional procedure. Therefore, the IBindStatusCallback interface of the auxiliary tool is adopted to deputize the IBindStatusCallback interface of the IE control to transfer the control right of download and installation of the ActiveX plug-in. Thus, the auxiliary tool can learn the implementing status of download and installation of the ActiveX plug-in through its own IBindStatusCallback interface, such that the auxiliary tool may monitor and manage the ActiveX plug-in, and operations needed by the embodiment of the present invention may be inserted in the procedure provided by the IE control for selectively installing the webpage plug-in.

Upon the deputizing, the auxiliary tool returns the control rights by allowing the IE control to invoke the CoGetClassObjectFromUrl API function.

Step 202: determine whether the subscriber has chosen not to install the ActiveX plug-in any more. If the subscriber has chosen not to install the ActiveX plug-in any more, terminate the procedure of selectively installing the ActiveX plug-in. Otherwise, perform Step 203.

In order to record the ActiveX plug-in shielded by the subscriber, that is, the ActiveX plug-in which the subscriber has chosen not to install any more, a list of shielded plug-ins is preset in the embodiment. The process of the auxiliary tool determining whether the subscriber has chosen not to install the ActiveX any more includes determining that the subscriber has chosen not to install the ActiveX plug-in any more if there is a record for the ActiveX plug-in in the list of shielded plug-ins; determining that the subscriber has not chosen not to install the ActiveX plug-in any more if there is no record for the ActiveX plug-in in the list of shielded plug-ins.

Upon the determining, the auxiliary tool notifies the IE control of a determining result to facilitate the IE control to determine the subsequent process.

Steps 203~204: the IE control determines whether the Internet security strategy allows the ActiveX plug-in to be used. If the Internet security strategy allows the ActiveX plug-in to be used, determine whether the local computer has installed an identical ActiveX plug-in. If the local computer has installed an identical ActiveX plug-in, terminate the procedure of selectively installing the ActiveX plug-in; otherwise, perform Step 205. If the Internet security strategy does not allow the ActiveX plug-in to be used, terminate the procedure of selectively installing the ActiveX plug-in.

When the IE control learns from the auxiliary tool that the subscriber has not chosen not to install the ActiveX plug-in any more, perform the two determining processes herein. Furthermore, the two determining processes in Steps 203~204 are the same as those in Steps 102 and 103 in the related art respectively.

Upon performing the above determining processes, the IE control returns determining results to the auxiliary tool through the IBindStatusCallback interface deputized.

Steps 205~207: the auxiliary tool obtains the information of the ActiveX plug-in by monitoring and prompts the subscriber to choose whether to download the ActiveX plug-in. If the subscriber chooses to download the ActiveX plug-in, the ActiveX plug-in will be downloaded to the local computer and Step 208 will be performed. If the subscriber chooses not-to-download and prompt later, the procedure of selectively installing the ActiveX plug-in is terminated. If the subscriber chooses not to download the ActiveX plug-in any more, the information of the ActiveX plug-in is added to the list of shielded plug-ins, the subscriber is informed that the ActiveX plug-in has been shielded, and the procedure of selectively installing the ActiveX plug-in is terminated.

After the operation in Step 201 is performed, during monitoring the ActiveX plug-in contained in the webpage, the browser using the IE control, receives the determining results from the IE control and learns that the ActiveX plug-in is waiting for being downloaded. Then the browser obtains detailed information of the ActiveX plug-in through the IBindStatusCallback interface of the auxiliary tool, and blocks an instant download of the ActiveX plug-in, thereby facilitating the prompt to the subscriber in this process.

In order to prompt the subscriber to choose whether to download the ActiveX plug-in, the auxiliary tool displays in this process the information of the ActiveX plug-in by, for example, popping up a dialog box, and provides three choices, that is, to-download, not-to-download and prompt later, and not-to-download any more. When the choices above are displayed, the subscriber makes a decision according to his/her own need.

If the subscriber chooses to-download, the auxiliary tool instructs the IE control to download the ActiveX plug-in to the local computer so as to implement selectively installing the ActiveX plug-in in subsequent process. If the subscriber chooses not-to-download and prompt later, make no processing of the ActiveX plug-in and terminate the procedure of selectively installing the ActiveX plug-in. If the subscriber chooses not-to-download any more, it indicates that the subscriber does not need the ActiveX plug-in, and the auxiliary tool adds the information of the ActiveX plug-in, such as the GUID and the like, to the list of shielded plug-ins. Moreover, for the sake of transparency of the shielded plug-ins, the auxiliary tool informs the subscriber that the ActiveX plug-in has been shielded by means of making an icon blinking. Additionally, for the convenience of display, detailed information of the ActiveX plug-in may be displayed when the subscriber clicks the icon blinking.

Steps 208~210: the IE control determines whether to make a security warning according to the Internet security strategy of the browser. If the IE control determines to make a security warning, the subscriber is prompted through the security warning to choose whether to install the ActiveX plug-in. The IE control determines whether to install the ActiveX plug-in according to the choice of the subscriber. If the subscriber chooses to install the ActiveX plug-in, perform Step 211. If the subscriber chooses not to install the ActiveX plug-in, terminate the procedure of selectively installing the ActiveX plug-in. If the IE control determines not to make a security warning, perform Step 211 directly.

The method of determining whether to make a security warning is the same as that described in Step 105 in the related art, which includes determining to make a security warning if the Internet security strategy of the browser is at the middle or middle-low level and determining not to make a security warning if the Internet security strategy of the browser is at the low level.

In the case of determining to make a security warning, the IE control displays both the information of the ActiveX plug-in downloaded in Step 207 and the security warning to the subscriber and prompts the subscriber to choose whether to install the ActiveX plug-in. The subscriber then makes a decision according to his/her own need.

Step 211: install the ActiveX plug-in in the local computer.

This process is the same as Step 108 in the related art. If the Internet security strategy of the browser indicates that the ActiveX plug-in may be installed directly without a security warning or the subscriber chooses to install the ActiveX plug-in in the local computer under the prompt of the security warning, the IE control installs the ActiveX plug-in downloaded in Step 207 in the local computer.

Thus, the procedure of selectively installing the plug-in in accordance with the embodiment is completed.

In the embodiment, when there is an ActiveX plug-in contained in the webpage, the auxiliary tool of download and installation of the ActiveX plug-in in accordance with the embodiment of the present invention modifies the procedure provided by the IE control and manages download and installation of the ActiveX plug-in. Specifically, if the ActiveX plug-in is one of the plug-ins shielded by the subscriber, the auxiliary tool blocks security warnings, prompt for choice of download of a plug-in, and prompt for choice of installation of a plug-in, thereby accelerating the speed of browsing a webpage, reducing operations of the subscriber, and improving the convenience. If the subscriber has not chosen not to install the ActiveX plug-in any more, only under the condition that the subscriber chooses to-download will the IE control be notified to download the ActiveX plug-in to the local computer, which effectively reduces the webpage blocking caused by downloading a webpage plug-in.

The embodiment above describes the implementation of selectively installing a webpage plug-in through managing download of the ActiveX plug-in. The following is an embodiment, describing the implementation of selectively installing a webpage plug-in through managing installation of the ActiveX plug-in.

In a second embodiment, the webpage plug-in is downloaded before the subscriber chooses to install the webpage plug-in.

Figure 4:
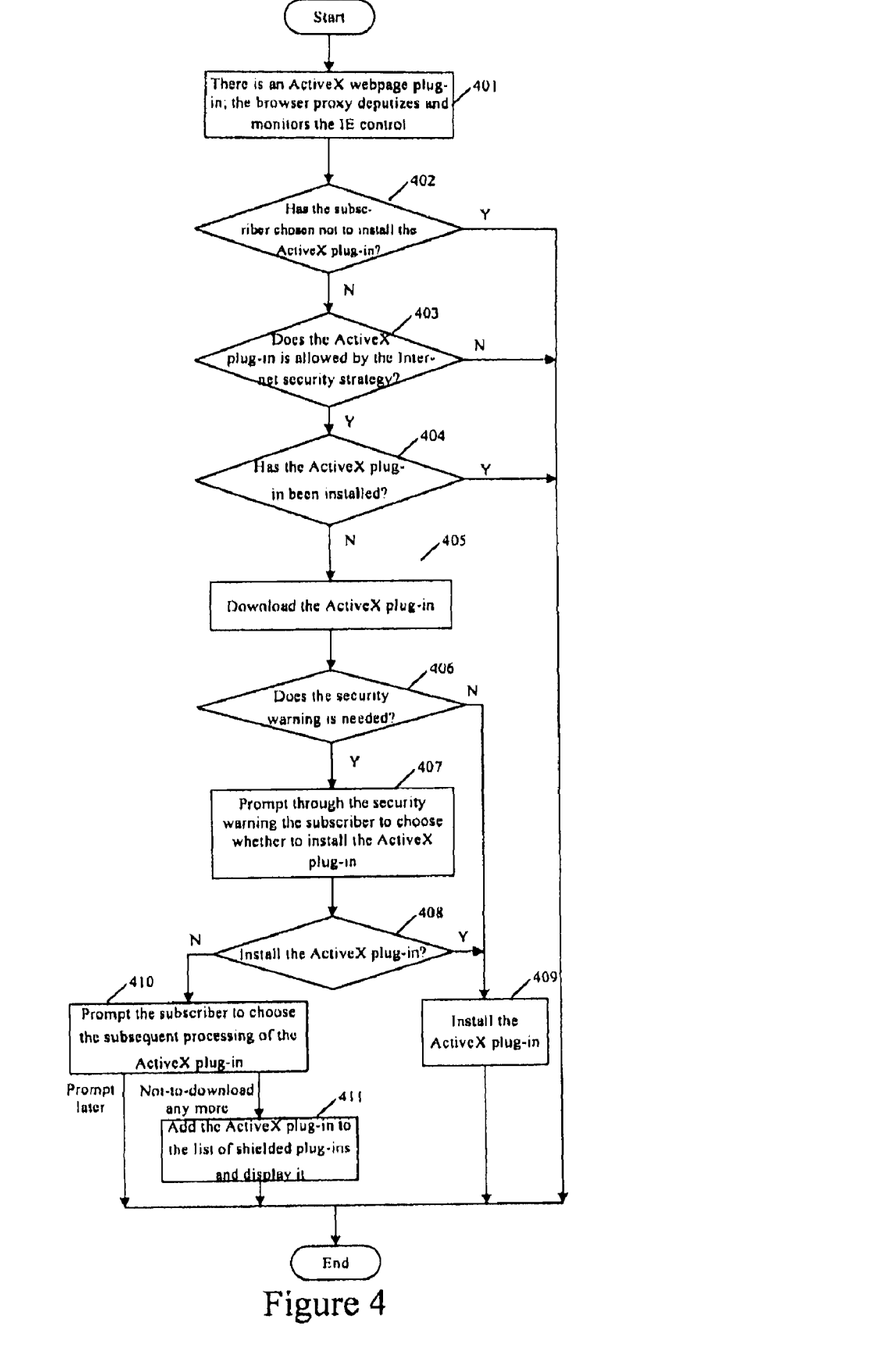
FIG. 4 is a flow chart illustrating a method for selectively installing a webpage plug-in in accordance with a second embodiment of the present invention.

As shown in FIG. 4, the method for selectively installing the webpage plug-in in accordance with the embodiment includes the following steps.

Steps 401~402: the IE control detects that the webpage that the subscriber is browsing contains an ActiveX plug-in. The auxiliary tool of download and installation of the webpage plug-in deputizes and monitors the IE control and determines whether the subscriber has chosen not to install the ActiveX plug-in any more. If the subscriber has chosen not to install the ActiveX plug-in any more, terminate the procedure of selectively installing the ActiveX plug-in; otherwise, perform Step 403.

Steps 403~404: determine whether the Internet security strategy allows the ActiveX plug-in to be used. If the Internet security strategy allows the ActiveX plug-in to be used, determine whether the local computer has installed an identical ActiveX plug-in. If the local computer has installed an identical ActiveX plug-in, terminate the procedure of selectively installing the ActiveX plug-in; otherwise, perform Step 405. If the Internet security strategy does not allow the ActiveX plug-in to be used, terminate the procedure of selectively installing the ActiveX plug-in.

The method and description in Steps 401~404 are the same as those in Steps 201~204.

Steps 405~406: the IE control downloads the ActiveX plug-in to the local computer and determines, according to the Internet security strategy, whether to make a security warning. If yes, perform Step 407; otherwise, perform Step 409.

When the Internet security strategy of the browser allows the ActiveX plug-in to be used and there is no identical ActiveX plug-in that has been installed in the local computer, the IE control downloads the ActiveX plug-in to the local computer for selectively installing the ActiveX plug-in in subsequent process.

After the ActiveX plug-in is downloaded, the auxiliary tool of download and installation of the webpage plug-in learns, through monitoring, that the ActiveX plug-in is waiting for being installed, and instructs the IE control to determine whether to make a security warning. Moreover, the process of determining whether to make a security warning is the same as that in Step 105 in the related art, that is, if the Internet security strategy of the browser is at the middle or middle-low level, determine to make a security warning; if the Internet security strategy of the browser is at the low level, determine not to make a security warning.

Step 407~408: prompt, through the security warning, the subscriber to choose whether to install the ActiveX plug-in. Determine whether to install the ActiveX plug-in according to the choice of the subscriber. If it is determined to install the ActiveX plug-in, install the ActiveX plug-in in the local computer and terminate the procedure of selectively installing the ActiveX plug-in. Otherwise, perform Step 410.

Step 409: if it is determined not to make the security warning, install the ActiveX plug-in in the local computer and terminate the procedure of selectively installing the ActiveX plug-in.

In the case of determining to make a security warning, the IE control displays the information of the ActiveX plug-in to the subscriber through the security warning and prompts the subscriber to choose according to his/her need whether to install the ActiveX plug-in. After the subscriber makes a choice, the choice is directly reflected in the auxiliary tool through the IBindStatusCallback interface since the auxiliary tool has been monitoring the procedure. If the subscriber chooses to install the ActiveX plug-in, the auxiliary tool instructs the IE control to install the ActiveX plug-in. If the subscriber chooses not to install the ActiveX plug-in, the auxiliary tool performs subsequent process.

Steps 410~411: the auxiliary tool prompts the subscriber to choose subsequent processing of the ActiveX plug-in. If the subscriber chooses not-to-install and prompt later, terminate the procedure of selectively installing the ActiveX plug-in. If the subscriber chooses not-to-install any more, the ActiveX plug-in is added to the list of shielded plug-ins and the procedure of selectively installing the ActiveX plug-in is terminated.

In case that the subscriber chooses not to install the ActiveX plug-in, the auxiliary tool prompts, through, for example, popping up a dialog box, the subscriber to choose from the two options, i.e., not-to-install and prompt later, and not-to-install any more. Moreover, if the subscriber chooses no-to-install any more, the information of the ActiveX plug-in is added to the list of shielded plug-ins, and the subscriber is informed by an icon blinking that the ActiveX plug-in is shielded. Additionally, for the convenience of display, detailed information of the ActiveX plug-in may be displayed when the subscriber clicks the icon blinking.

Thus, the procedure of selectively installing a webpage plug-in in accordance with the second embodiment is completed.

In the embodiment, when there is an ActiveX plug-in contained in the webpage, the auxiliary tool of download and installation of the webpage plug-in in accordance with the embodiment of the present invention modifies the procedure provided by the IE control and manages download and installation of the ActiveX plug-in. Specifically, if the ActiveX plug-in is one of the ActiveX plug-ins which the subscriber has chosen not to install any more, the auxiliary tool forbids downloading the webpage plug-in and shields security warnings, prompt for choice of download of a plug-in, and prompt for choice of installation of plug-in, thus accelerating the speed of browsing a webpage, reducing operations of the subscriber, and improving the convenience.

Figure 5:
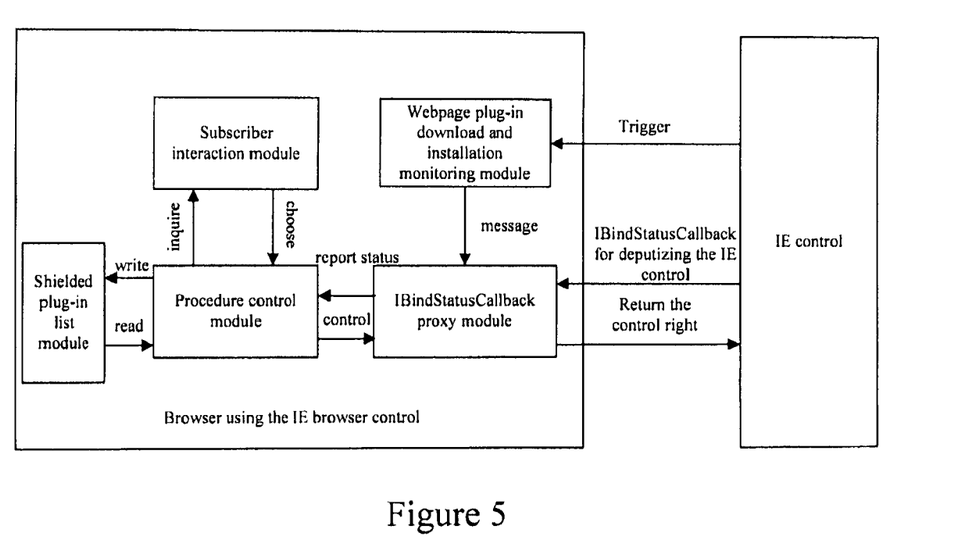
FIG. 5 is a schematic diagram illustrating an apparatus for selectively installing a webpage plug-in in accordance with an embodiment of the present invention.

According to the method for selectively installing a webpage plug-in, an embodiment of the present invention describes an apparatus for selectively installing the webpage plug-in shown in FIG. 5. The apparatus includes a browser control and an auxiliary tool of download and installation of the webpage plug-in, which are connected with each other. The browser control is used to detect a webpage plug-in, download and install the webpage plug-in in the local computer.

The auxiliary tool of download and installation of the webpage plug-in according to the embodiment of the present invention includes an IBindStatusCallback proxy module, a procedure control module, a shielded plug-in list module, a webpage plug-in download and installation monitoring module that transmits signals to the IBindStatusCallback proxy module, and a subscriber interaction module interacting with the procedure control module.

In the apparatus for selectively installing a webpage plug-in, the specific function of each module of the auxiliary tool of download and installation of the webpage plug-in is described below.

The webpage plug-in download and installation monitoring module is configured to monitor the browser control, obtain a process of downloading and installing the webpage plug-in, and transfer process information to the procedure control module through the IBindStatusCallback proxy module.

The IBindStatusCallback module is configured to receive the process information from the webpage plug-in download and installation monitoring module, forward the process information to the procedure control module. And under control of the procedure control module, the IBindStatusCallback proxy module deputizes the browser control, returns the control right, and starts up the operations of the browser control during the procedure of download and installation of the webpage plug-in, e.g., determining whether the webpage plug-in is allowed and whether the webpage plug-in has been installed, downloading and installing the webpage plug-in, and so on.

The subscriber interaction module is configured to, under the instruction of the procedure control module, display the prompt related to downloading a webpage plug-in, such as security warnings, prompt for choice of download of a plug-in, and prompt for choice of installation of plug-in, and return the choice of the subscriber to the procedure control module.

The shielded plug-in list module is configured to store a list of shielded plug-ins containing the information of webpage plug-in which the subscriber chooses not to install any more, receive the information of webpage plug-in provided by the procedure control module to update the list of shielded plug-ins, search the list of shielded plug-ins to determine whether the webpage plug-in has been shielded by the subscriber, and submit a searching result to the procedure control module.

The procedure control module is configured to manage the process of downloading and installing the webpage plug-in according to the process information sent by the webpage plug-in download and installation monitoring module, the choice of the subscriber submitted by the subscriber interaction module, and the searching result submitted from the shielded plug-in list module, instruct the IBindStatusCallback proxy module to deputize the IE control, return the control right, and then start up the browser control during the procedure of downloading and installing the webpage plug-in, instruct the subscriber interaction module to display the prompt related to download and installation of the webpage plug-in, and transfer to the shielded plug-in list module the information of webpage plug-in which has been shielded by the subscriber.

In actual applications, the browser control above may be the IE control and the webpage plug-in may be the ActiveX plug-in.

The foregoing descriptions are only preferred embodiments of the present invention and are not for use in limiting the protection scope thereof. All the modifications, equivalent replacements or improvements in the scope of the sprit and principle of the present invention shall be included in the protection scope of the present invention.

What is claimed is:

1. A method for selectively installing a webpage plug-in, comprising:

by a browser control, detecting a webpage plug-in in a webpage, obtaining information about the webpage plug-in, and invoking a CoGetClassObjectFromUrl API Function;

by an auxiliary tool connected with the browser control, intercepting the invocation of the CoGetClassObjectFromUrl API function using an Application Program Interface Hook (API Hook) technique;

by the auxiliary tool, replacing an IBindStatusCallback interface of the browser control by an IBindStatusCallback interface in the auxiliary tool; and by the IBindStatusCallback interface in the auxiliary tool, controlling download and installation of the webpage plug-in through steps of:

obtaining the information about the webpage plug-in from the browser control, determining whether the webpage plug-in has been shielded by a subscriber according to the information about the webpage plug-in and a list of shielded plug-ins that records information about webpage plug-ins shielded by the subscriber;

terminating the method of selectively downloading and installing the webpage plug-in if the webpage plug-in has been shielded by the subscriber;

instructing the browser control to download and install the webpage plug-in if the webpage plug-in has not been shielded by the subscriber by returning control rights to the CoGetClassObjectFromUrl API function to the browser control; and by the browser control, downloading the webpage plug-in and installing the webpage plug-in.

2. The method of claim 1, further comprising:

before downloading the webpage plug-in, by the browser control, determining whether an Internet security strategy of a browser allows the webpage plug-in to be used;

by the browser control, downloading the webpage plug-in if the Internet security strategy of the browser allows the webpage plug-in to be used; and by the browser control, terminating—the method of selectively downloading and installing the webpage plug-in if the Internet security strategy of the browser does not allow the webpage plug-in to be used.

3. The method of claim 1, further comprising:

before downloading the webpage plug-in, by the browser control, determining whether a local computer has installed an identical webpage plug-in;

by the browser control, terminating the method of selectively downloading and installing the webpage plug-in if the local computer has installed an identical webpage plug-in;

by the browser control, downloading the webpage plug-in if the local computer has not installed an identical webpage plug-in.

4. The method of claim 1, wherein said determining whether the webpage plug-in has been shielded by the subscriber comprises:

by the auxiliary tool, determining that the webpage plug-in has been shielded by the subscriber if there is a record for the webpage plug-in in the list of shielded plug-ins;

by the auxiliary tool, determining that the webpage plug-in has not been shielded by the subscriber if there is no record for the webpage plug-in in the list of shielded plug-ins.

5. The method of claim 1, further comprising:

before downloading the webpage plug-in, by the auxiliary tool, prompting the subscriber to choose whether to download the webpage plug-in;

by the browser control, downloading the webpage plug-in if the subscriber chooses to download the webpage plug-in;

by the auxiliary tool, updating the list of shielded plug-ins and terminating the procedure of selectively installing the webpage plug-in if the subscriber chooses not-to-download any more.

6. The method of claim 5, further comprising:

upon prompting the subscriber to choose whether to download the webpage plug-in, by the auxiliary tool, terminating the method of selectively downloading and installing the webpage plug-in if the subscriber chooses not-to-download and prompt later.

7. The method of claim 5, further comprising:

before installing the webpage plug-in, by the browser control, determining whether to make a security warning according to the Internet security strategy of the browser;

if determining to make the security warning, by the browser control, prompting the subscriber to choose whether to install the webpage plug-in through the security warning;

by the browser control, determining whether to install the webpage plug-in according to a choice of the subscriber;

by the browser control, installing the webpage plug-in in the local computer if the subscriber chooses to install the webpage plug-in;

by the browser control, terminating the method of selectively downloading and installing the webpage plug-in if the subscriber chooses not to install the webpage plug-in;

if determining not to make the security warning, by the browser control, performing said installing the webpage plug-in.

8. The method of claim 5, wherein said updating the list of shielded plug-ins comprises, by the auxiliary tool, adding the information of the webpage plug-in to the list of shielded plug-ins.

9. The method of claim 1, wherein said downloading and installing the webpage plug-in comprises:

by the browser control, downloading the webpage plug-in in a local computer;

by the browser control, determining whether to make a security warning according to an Internet security strategy of a browser;

if determining to make the security warning, by the browser control, prompting the subscriber to choose whether to install the webpage plug-in through the security warning;

by the browser control, determining whether to install the webpage plug-in according to a choice of the subscriber;

by the browser control, installing the webpage plug-in in the local computer if the subscriber chooses to install the webpage plug-in;

by the browser control, terminating the method of selectively downloading and installing the webpage plug-in if the subscriber chooses not to install the webpage plug-in;

if determining not to make the security warning, by the browser control, performing said installing the webpage plug-in.

10. The method of claim 9, further comprising:

by the browser control, before terminating the method of selectively downloading and installing the webpage plug-in, by the auxiliary tool, prompting the subscriber to choose subsequent processing of the webpage plug-in;

by the auxiliary tool, terminating the method of selectively downloading and installing the webpage plug-in if the subscriber chooses not-to-download and prompt later;

by the auxiliary tool, updating the list of shielded plug-ins if the subscriber chooses not-to-download any more.

11. The method of claim 10, wherein said updating the list of shielded plug-ins comprises, by the auxiliary tool, adding the information of the webpage plug-in to the list of shielded plug-ins.

12. An apparatus for selectively downloading and installing a webpage plug-in, comprising:

a processor and memory wherein the memory stores:

a browser control configured to detect a webpage plug-in in a webpage and to download and install the webpage plug-in in a local computer according to an instruction received; and an auxiliary tool connected with the browser control, configured to use an Application Program Interface Hook (API Hook) technique to intercept an invocation of a CoGetClassObjectFromUrl API function by the browser control, store a list of shielded plug-ins recording information about webpage plug-ins shielded by a subscriber, replace an IBindStatusCallback interface of the browser control by an IBindStatusCallback interface in the auxiliary tool, and use the IBindStatusCallback interface in the auxiliary tool to control download and installation of the webpage plug-in through operations of:

obtaining information about the webpage plug-in from the browser control, determining whether the webpage plug-in has been shielded by the subscriber according to the information about the webpage plug-in and the list of shielded plug-ins; instructing the browser control to download and install the webpage plug-in through returning control rights to the CoGetClassObjectFromUrl API function if the webpage plug-in has not been shielded by the subscriber; terminating the selectively downloading and installing the webpage plug-in if the webpage plug-in has been shielded by the subscriber.

13. The apparatus of claim 12, wherein the auxiliary tool comprises:

a monitoring module, configured to monitor the browser control, intercept control rights of the browser control for downloading and installing the webpage plug-in by using the API Hook technique to intercept the invocation of the CoGetClassObjectFromUrl API function and obtain the information about the webpage plug-in;

a proxy module, configured to receive the control rights of the browser control for downloading and installing the webpage plug-in and the information about the webpage plug-in from the monitoring module, replace the IBindStatusCallback interface of the browser control by the IBindStatusCallback interface in the auxiliary tool, and make the browser control start operations of downloading and installing the webpage plug-in;

a shielded plug-in list module, configured to store the list of shielded plug-ins, obtain the information about webpage plug-ins shielded by the subscriber from the proxy module, determine whether the webpage plug-in has been shielded by the subscriber, update the list of shielded plug-ins and send a determining result to the proxy module if the webpage plug-in has been shielded.

14. The apparatus of claim 13, further comprising:

a procedure control module, configured between the proxy module and the shielded plug-in list module to receive the control rights of the browser control for downloading and installing the webpage plug-in and the information about the webpage plug-in forwarded by the proxy module and the determining result sent by the shielded plug-in list module, manage the selectively downloading and installing of the webpage plug-in, instruct the proxy module to replace the IBindStatusCallback interface of the browser control by and make the browser control start the operations of downloading and installing the webpage plug-in; and transfer the information about webpage plug-ins shielded by the subscriber to the shielded plug-in list module.

15. The apparatus of claim 14, further comprising:

a subscriber interaction module, configured to display a prompt related to downloading and installing the webpage plug-in, and return a choice of the subscriber to the procedure control module.

* * * * *